(12) United States Patent
Toyama et al.

(10) Patent No.: US 8,243,178 B2
(45) Date of Patent: Aug. 14, 2012

(54) PHYSICAL QUANTITY DISTRIBUTION DETECTING APPARATUS AND IMAGING APPARATUS

(75) Inventors: Takayuki Toyama, Kanagawa (JP); Yukihiro Yasui, Kanagawa (JP); Noriyuki Fukushima, Kanagawa (JP); Atsushi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/818,663

(22) Filed: Jun. 18, 2010

(65) Prior Publication Data

US 2010/0253772 A1    Oct. 7, 2010

Related U.S. Application Data

(63) Continuation of application No. 11/695,251, filed on Apr. 2, 2007, now Pat. No. 7,755,686.

(30) Foreign Application Priority Data

Apr. 3, 2006  (JP) ................................. 2006-101387

(51) Int. Cl.
*H04N 3/14* (2006.01)
*H04N 5/335* (2011.01)
(52) U.S. Cl. ..................................... 348/300; 250/208.1
(58) Field of Classification Search ........................ None
See application file for complete search history.

(56) References Cited

U.S. PATENT DOCUMENTS

| | | | |
|---|---|---|---|
| 6,201,412 B1 | 3/2001 | Iwata et al. | |
| 6,693,575 B1 | 2/2004 | Yang et al. | |
| 6,788,237 B1 | 9/2004 | Bidermann et al. | |
| 2002/0109160 A1* | 8/2002 | Mabuchi et al. | 257/233 |
| 2002/0196170 A1 | 12/2002 | McIlrath | |
| 2005/0024130 A1 | 2/2005 | Koike | |
| 2005/0041128 A1* | 2/2005 | Baker | 348/308 |
| 2006/0001750 A1* | 1/2006 | Mizuguchi et al. | 348/294 |
| 2006/0007331 A1 | 1/2006 | Izumi et al. | |
| 2007/0139242 A1* | 6/2007 | Krymski | 341/155 |

FOREIGN PATENT DOCUMENTS

| | | |
|---|---|---|
| JP | HEI 11-103248 A | 4/1999 |
| JP | 2005-311487 A | 11/2005 |
| JP | 2005-328326 A | 11/2005 |

OTHER PUBLICATIONS

Japanese Office Action dated Apr. 24, 2008 for Application No. 2006-101387.
Kleinfelder, Stuart et al., "A 10 000 Frames/s CMOS Digital Pixel Sensor", IEEE Journal of Solid-state Circuits, vol. 36, No. 12, Dec. 2001.

* cited by examiner

*Primary Examiner* — Nelson D. Hernández Hernández
*Assistant Examiner* — Dennis Hogue
(74) *Attorney, Agent, or Firm* — SNR Denton US LLP

(57) ABSTRACT

A physical quantity distribution detecting apparatus includes a sensor array in which a plurality of unit sensors for sensing physical quantity are two-dimensionally arranged in a matrix; and an analog-to-digital conversion unit that includes a plurality of comparators for comparing an analog signal read from the unit sensor with a reference signal, the analog-to-digital conversion unit converting a digital signal by measuring a period of time or measuring a signal corresponding to the period of time of each comparison output of the plurality of comparators. Each of the plurality of comparators includes at least one capacitor element connected between a signal line and a constant-voltage line.

3 Claims, 7 Drawing Sheets

PHYSICAL QUANTITY DISTRIBUTION DETECTING APPARATUS AND IMAGING APPARATUS

RELATED APPLICATION DATA

The present application is a continuation of U.S. application Ser. No. 11/695,251, filed on Apr. 2, 2007, and claims priority to Japanese Application No. 2006-101387, filed on Apr. 3, 2006, which is incorporated herein by reference to the extent permitted by law.

BACKGROUND OF THE INVENTION

1. Field of the Invention

The present invention relates to physical quantity distribution detecting apparatuses and imaging apparatuses, and more particularly, to a physical quantity distribution detecting apparatus including a column-parallel analog-to-digital (AD) conversion unit and an imaging apparatus including a solid-state imaging device, which is the physical quantity distribution detecting apparatus, used as an imaging device.

2. Description of the Related Art

As physical quantity distribution detecting apparatuses for sensing distribution of physical quantities, for example, solid-state imaging devices are available in which a plurality of unit pixels (unit sensors) each including a photoelectric transducer for sensing the light intensity of incident light are two-dimensionally arranged in a matrix. Complementary metal-oxide semiconductor (CMOS) image sensors that can be produced in accordance with a process similar to that for CMOS integrated circuits (ICs) are widely known as solid-state imaging devices.

With miniaturization technology being used in CMOS processes, such CMOS image sensors easily achieve an active configuration in which an amplification function is provided for each pixel. In addition, in such CMOS image sensors, a driving circuit for driving a pixel array in which a plurality of pixels are two-dimensionally arranged in a matrix and a signal processing circuit can be integrated on a chip on which the pixel array is formed. In addition, compared with charge-coupled device (CCD) image sensors, which have been in the mainstream, CMOS image sensors can be driven at a higher speed. Thus, in recent years, much research and development on CMOS image sensors has been carried out.

As a signal output system of CMOS image sensors, a column-parallel output system in which pixels arranged in a pixel array are selected in units of rows and signals of pixels in a selected row are simultaneously read in a column direction (that is, a direction along pixel columns) is mainly used. Various configurations of a signal output circuit of such a parallel-output CMOS image sensor have been proposed. For example, a CMOS image sensor described in Japanese Unexamined Patent Application Publication No. 2005-328326 has one of the most advanced configurations. The CMOS image sensor includes a column-parallel AD conversion unit having a configuration in which AD converters are arranged for individual columns and analog signals output from pixels are extracted as digital signals.

A signal-to-noise (S/N) ratio by which the image quality of a CMOS image sensor is determined will be generally described. "S" represents a value obtained when a floating diffusion unit converts an electron stored in a pixel into a voltage. "N" represents optical shot noise that depends on the intensity of incident light, flicker noise (1/f noise) that depends on the size or process of an amplifying transistor provided in a pixel or a transistor provided in another analog circuit, white noise (thermal noise) that depends on a transistor resistance and a wiring resistance, or circuit noise caused by a potential variation in a power supply or a ground.

To date, no method has been developed for removing optical shot noise. Since optical shot noise is present in any image sensor, generally, optical shot noise components are not considered in the total noise when a method for increasing the S/N ratio is considered. That is, in general, reducing 1/f noise, white noise, and circuit noise caused by a variation in a power supply or a ground is important for increasing the S/N ratio.

In order to reduce 1/f noise, in general, the size of a transistor provided in a pixel or provided in a circuit through which an analog signal passes is increased or the width of a sampling frequency is reduced. In order to reduce white noise, in general, the pass-band width of a signal is reduced. This is because white noise is determined in accordance with the product of a noise density and the pass-band width of a signal. In order to reduce circuit noise caused by a variation in the power supply or the ground, in general, a constant of a transistor within a circuit is set so as to increase the power-supply voltage rejection ratio (PSRR) of a comparator.

SUMMARY OF THE INVENTION

Circuit noise caused by a potential variation in a power supply or a ground will now be considered. In a CMOS image sensor including a column-parallel AD conversion unit, comparators forming AD converters provided for individual columns are of a differential amplifier type and each include, for example, a differential input unit 100, an inverted buffer unit 110, and an inverter 120, as shown in FIG. 7.

The differential input unit 100 includes differential pair transistors 101 and 102, active load transistors 103 and 104, a constant-current source transistor 105, capacitor elements 106 and 107, and switch transistors 108 and 109. The inverted buffer unit 110 includes an inverted transistor 111 and a constant-current source transistor 112 that are connected in series between a power-supply line L101 of a first power-supply voltage Vdd and a power-supply line L102 of a second power-supply voltage Vss. The inverter 120 includes inverse-conductivity-type transistors 121 and 122 that are connected in series between the power-supply lines L101 and L102. The gates of the inverse-conductivity-type transistors 121 and 122 are connected to each other.

In such a comparator of a differential amplifier type, a ramp reference signal is input to the gate of the differential pair transistor 101 of the differential input unit 100, and an analog signal (pixel signal) output from a pixel is input to the gate of the differential pair transistor 102. In the differential input unit 100, when the pixel signal is compared with the reference signal, a current flows from the power-supply line L101 of the first power-supply voltage Vdd to the inverted transistor 111. Thus, a voltage drop in the power-supply line L101 occurs in some columns.

If an output of a comparator located in a column is inverted and an output of a comparator located in the immediately adjacent column is not inverted, a comparison threshold (a comparison determination point) of the non-inverted comparator changes by the amount corresponding to the influence of a voltage drop in the power-supply line L101. The change in the comparison threshold of the non-inverted comparator appears on the screen as circuit noise caused by a potential variation in the power-supply voltage Vdd. In particular, in a CMOS image sensor including a column-parallel AD conversion unit, comparators are provided for individual columns. Thus, a large voltage drop occurs in the power-supply line L101 when a plurality of comparators are collectively inverted, resulting in generation of noise, which is problematic.

The problems of the related art have been described by way of example of CMOS image sensors including a column-parallel AD conversion unit. However, such problems do not necessarily occur in CMOS image sensors. Such problems generally occur in physical quantity distribution detecting apparatuses including a column-parallel AD conversion unit for sensing the distribution of physical quantities.

It is desirable to provide a physical quantity distribution detecting apparatus that is capable of reducing circuit noise caused by a potential variation in a power supply or a ground and an imaging apparatus including a solid-state imaging device, which is the physical quantity distribution detecting apparatus, used as an imaging device.

A physical quantity distribution detecting apparatus according to an embodiment of the present invention includes a sensor array in which a plurality of unit sensors for sensing physical quantity are two-dimensionally arranged in a matrix; and analog-to-digital conversion means that includes a plurality of comparators for comparing an analog signal read from the unit sensor with a reference signal, the analog-to-digital conversion means converting a digital signal by measuring a period of time or measuring a signal corresponding to the period of time of each comparison output of the plurality of comparators. Each of the plurality of comparators includes at least one capacitor element connected between a signal line and a constant-voltage line.

In the physical quantity distribution detecting apparatus having the above-mentioned configuration, when the potential of a constant-voltage line (that is, the potential of the power supply or the ground) varies, a capacitor element connected between a signal line and the constant-voltage line varies the potential of the signal line in accordance with the potential variation in the constant-voltage line. Thus, when an analog signal is compared with a reference signal, even if a voltage drop occurs in the power-supply line, which is the constant-voltage line, the potential of the signal line is reduced by the amount corresponding to the voltage drop in the power-supply line due to an operation of the capacitor element. Therefore, a comparison threshold (a comparison determination point) of a comparator does not vary.

As described above, even if the voltage drop occurs in the power-supply line, the comparison threshold of the comparator does not vary. Thus, circuit noise caused by the potential variation in the power-supply or the ground can be reduced.

DESCRIPTION OF THE PREFERRED EMBODIMENTS

Embodiments of the present invention will be described with reference to the drawings.

Figure 1:
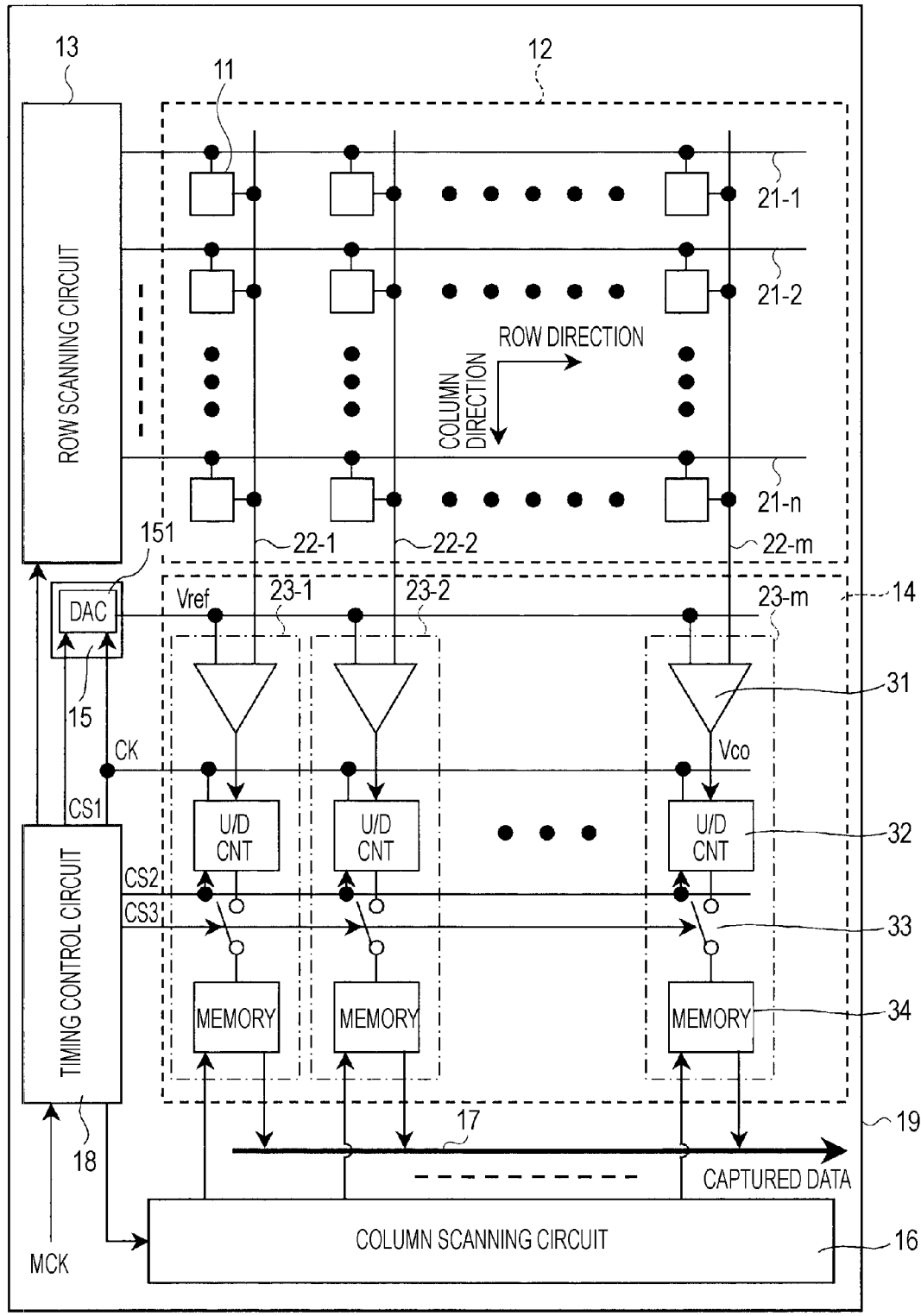
FIG. 1 is a block diagram showing a configuration of a CMOS image sensor according to an embodiment of the present invention including a column-parallel AD conversion unit.

FIG. 1 is a block diagram showing a configuration of a physical quantity distribution detecting apparatus according to an embodiment of the present invention. The physical quantity distribution detecting apparatus is, for example, a CMOS image sensor 10 including a column-parallel AD conversion unit. Referring to FIG. 1, the CMOS image sensor 10 according to the embodiment of the present invention includes a pixel array 12 in which a plurality of unit pixels 11 each including a photoelectric transducer are two-dimensionally arranged in a matrix. The CMOS image sensor 10 also includes a row scanning circuit 13, a column processing unit 14, a reference signal generator 15, a column scanning circuit 16, a horizontal output line 17, and a timing control circuit 18.

With this system configuration, the timing control circuit 18 generates a clock signal, a control signal, and the like in accordance with a master clock MCK, and transmits the clock signal, the control signal, and the like to the row scanning circuit 13, the column processing unit 14, the reference signal generator 15, and the column scanning circuit 16. Each of the row scanning circuit 13, the column processing unit 14, the reference signal generator 15, and the column scanning circuit 16 operates on the basis of the clock signal, the control signal, and the like.

Driving systems and signal processing systems that drive and control the unit pixels 11 in the pixel array 12, that is, the row scanning circuit 13, the column processing unit 14, the reference signal generator 15, the column scanning circuit 16, the horizontal output line 17, and the timing control circuit 18 are integrated on a chip (semiconductor substrate) 19 on which the pixel array 12 is formed.

In the pixel array 12, the unit pixels 11 are two-dimensionally arranged in m columns and n rows. In addition, with respect to the pixel arrangement of m columns and n rows, row control lines 21 (21-1 to 21-n) are provided for corresponding rows, and column signal lines 22 (22-1 to 22-m) are provided for corresponding columns. First ends of the row control lines 21-1 to 21-n are connected to output terminals of the row scanning circuit 13, which are provided for corresponding rows. The row scanning circuit 13 includes shift registers, address decoders, and the like. The row scanning circuit 13 controls row addresses in the pixel array 12 and row scanning through the row control lines 21-1 to 21-n.

The column processing unit 14 includes analog-to-digital converters (ADCs) 23-1 to 23-m. For example, the ADCs 23-1 to 23-m are provided for corresponding pixel columns of the pixel array 12. That is, the ADCs 23-1 to 23-m have a one-to-one relationship with the column signal lines 22-1 to 22-m. The column processing unit 14 converts analog signals (pixel signals) received from individual columns of the unit pixels 11 in the pixel array 12 into digital signals, and outputs the digital signals.

The reference signal generator 15 includes, for example, a digital-to-analog converter (DAC) 151. The DAC 151 generates a reference signal Vref whose voltage changes stepwise with the lapse of time, which is a so-called ramp reference signal. The ramp reference signal Vref is not necessarily generated using the DAC 151.

Under the control of a control signal CS1 supplied from the timing control circuit 18, the DAC 151 generates the ramp reference signal Vref on the basis of a clock CK supplied from the timing control circuit 18, and supplies the generated ramp reference signal Vref to each of the ADCs 23-1 to 23-m in the column processing unit 14.

All the ADCs 23-1 to 23-m have the same configuration. In the following description, the ADC 23-m will be described as an example. The ADC 23-m includes a comparator 31, a counter, such as an up/down counter (U/DCNT) 32, a transfer switch 33, and a memory 34.

The comparator 31 compares a signal voltage Vx of the column signal line 22-m corresponding to a pixel signal output from each of the unit pixels 11 in the nth column of the pixel array 12 with the ramp reference signal Vref supplied from the reference signal generator 15. For example, when the reference signal Vref is larger than the signal voltage Vx, an output Vco is at "H" level. In contrast, when the reference signal Vref is smaller than or equal to the signal voltage Vx, the output Vco is at "L" level.

The up/down counter 32 is an asynchronous counter. Under the control of a control signal CS2 supplied from the timing control circuit 18, the clock CK is supplied from the timing control circuit 18 to each of the up/down counter 32 and the DAC 151 at the same time. The up/down counter 32 performs down-counting or up-counting in synchronization with the clock CK, so that a comparison period from the beginning to the ending of the comparison operation of the comparator 31 can be measured.

Under the control of a control signal CS3 supplied from the timing control circuit 18, the transfer switch 33 is turned on (i.e., connected) when the up/down counter 32 completes the counting operation for a unit pixel 11 in a certain row, and transfers the counted result acquired by the up/down counter 32 to the memory 34.

As described above, the analog signals for the individual columns supplied from the corresponding unit pixels 11 of the pixel array 12 through the corresponding column signal lines 22-1 to 22-m are converted into N-bit digital signals by the operations of the comparators 31 and the up/down counters 32 of the corresponding ADCs 23 (23-1 to 23-m), and the N-bit digital signals are stored in the corresponding memories 34 (34-1 to 34-m).

The column scanning circuit 16 includes shift registers, address decoders, and the like. The column scanning circuit 16 controls column addresses of the ADCs 23-1 to 23-m in the column processing unit 14 and column scanning. Under the control of the column scanning circuit 16, the N-bit digital signals that have been AD-converted by the ADCs 23-1 to 23-m are read to the horizontal output line 17 having a 2N-bit width in order, and output as captured data through the horizontal output line 17.

Although not illustrated, for example, a circuit that performs various types of signal processing on the captured data output through the horizontal output line 17 may also be provided, in addition to the above-described component parts.

In the CMOS image sensor 10 including a column-parallel AD conversion unit according to the embodiment of the present invention, counted results of the up/down counters 32 can be selectively transferred to the memories 34 through the transfer switches 33. Thus, the CMOS image sensor 10 is capable of separately controlling the counting operations of the up/down counters 32 and the reading operations of the counted results of the up/down counters 32 to the horizontal output line 17 individually.

First Embodiment

Figure 2:
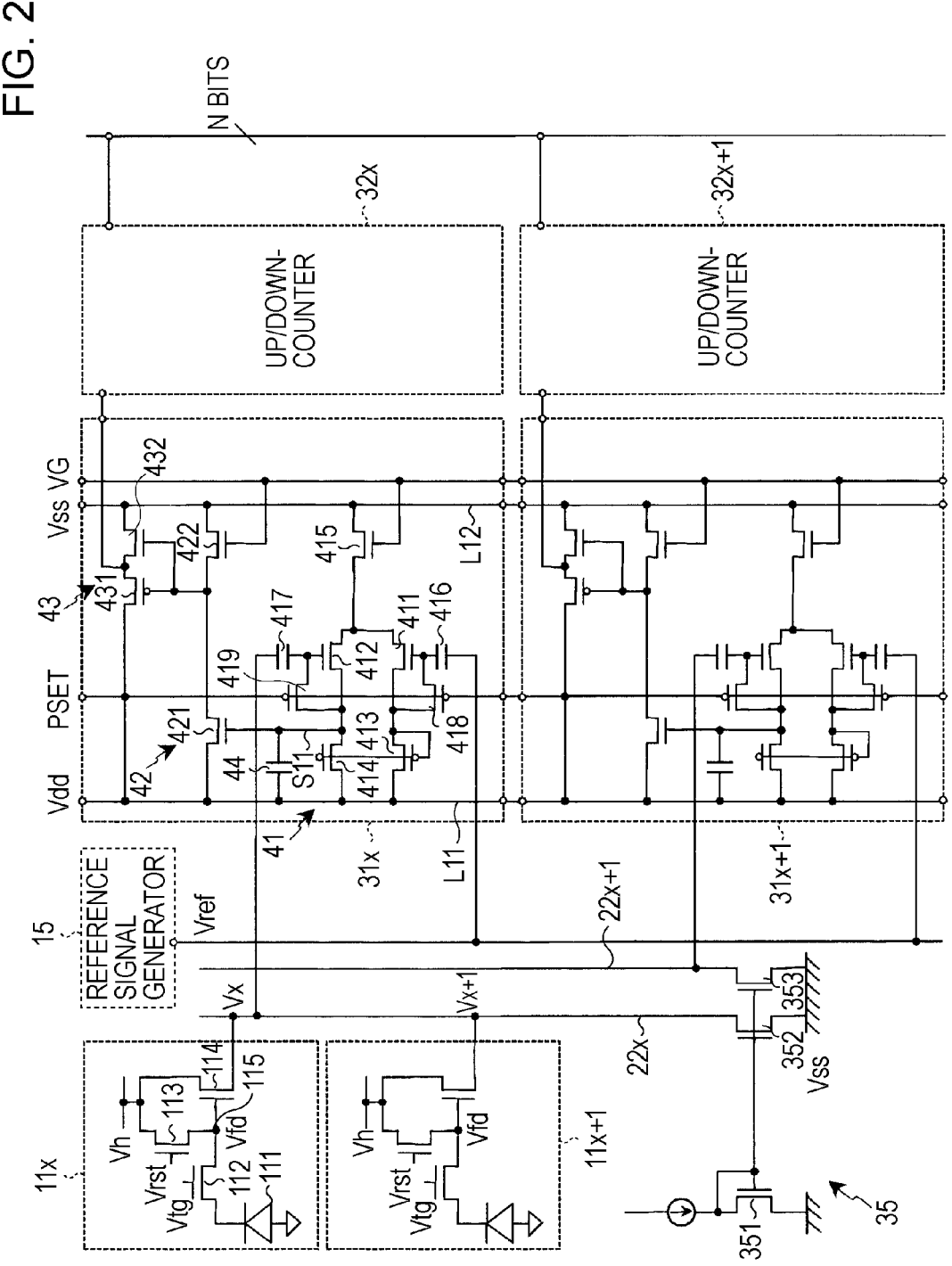
FIG. 2 is a circuit diagram showing an example of circuit configurations of comparators used in a first embodiment of the present invention.
Figure 3:
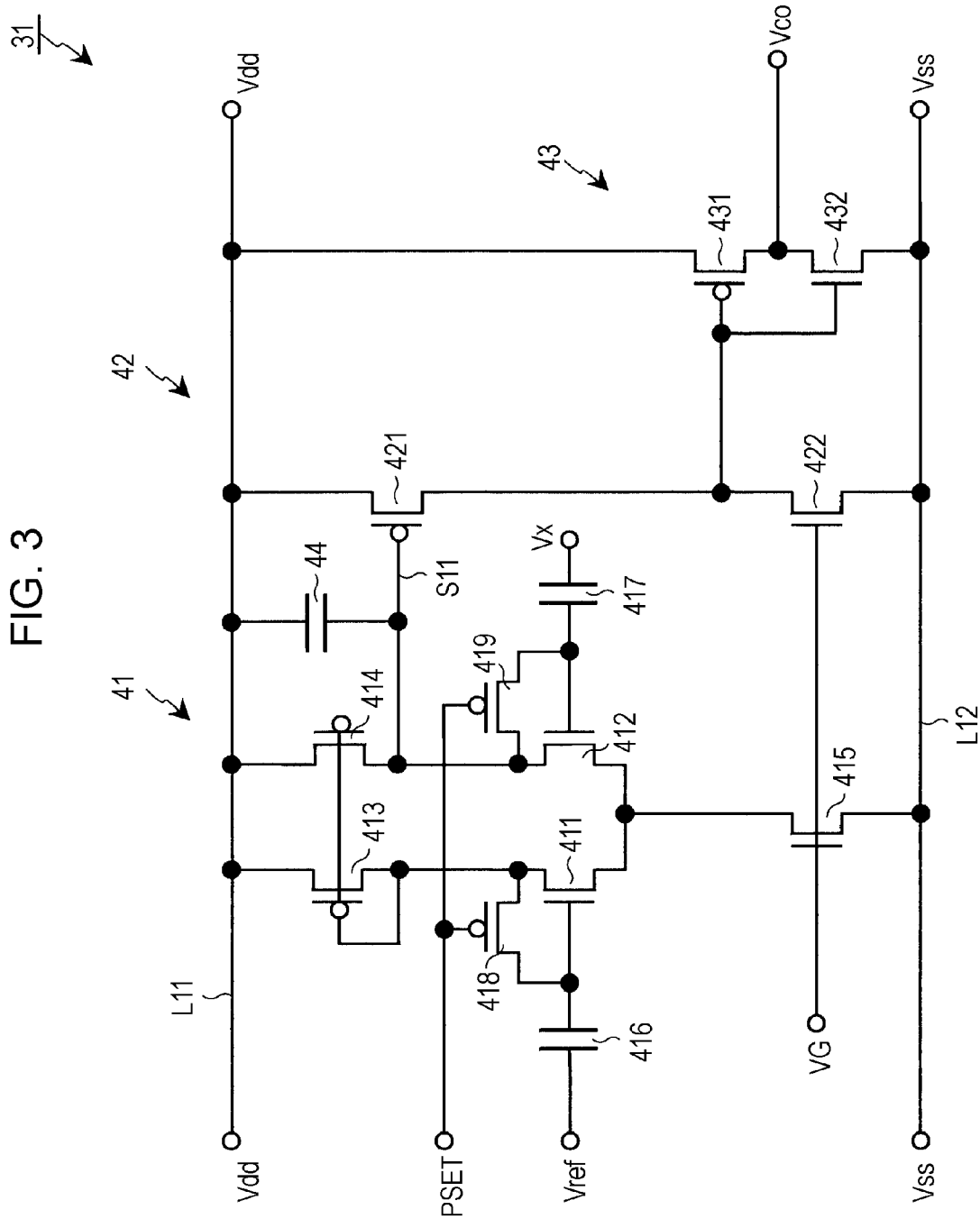
FIG. 3 is a circuit diagram showing a circuit configuration in which a principal portion of FIG. 2 is enlarged.

FIG. 2 is a circuit diagram showing an example of circuit configurations of comparators used in a first embodiment of the present invention. Specific circuit configurations of the comparators 31 (31x and 31x+1) in the xth column and the x+1th column will be described together with circuit configurations of the unit pixels 11 (11x and 11x+1). FIG. 3 shows an example of a circuit diagram in which a principal portion of FIG. 2 is enlarged.

Each of the unit pixels 11 includes a photoelectric transducer (for example, a photodiode) 111. Each of the unit pixels 11 also includes, for example, a transfer transistor 112 that transfers an electric charge obtained by photoelectric conversion at the photoelectric transducer 111 to a floating diffusion (FD) unit 115, a reset transistor 113 that controls the potential Vfd of the FD unit 115, and an amplifying transistor 114 that outputs a signal corresponding to the potential Vfd of the FD unit 115 to the corresponding column signal line 22 (22x or 22x+1). That is, each of the unit pixels 11 has a three-transistor configuration.

However, each of the unit pixels 11 does not necessarily have the three-transistor configuration. Each of the unit pixels 11 may have a four-transistor configuration including a selecting transistor for selecting a pixel, in addition to the three transistors.

First ends of the column signal lines 22 (22x and 22x+1) are connected to a constant-current source 35. The constant-current source 35 includes a transistor 351 having a diode-connected configuration in which the gate and drain thereof are connected to each other. The constant-current source 35 also includes transistors 352 and 353. The transistor 352 is connected between the first end of the column signal line 22x and the ground, and the transistor 353 is connected between the first end of the column signal line 22x+1 and the ground. The gates of the transistors 352 and 353 are commonly connected to the gate of the transistor 351, and the transistor 351 and the transistors 352 and 353 form a current mirror circuit.

Each of the comparators 31 includes a differential input unit 41, an inverted buffer unit 42, and a digital unit 43.

The differential input unit 41 includes differential pair transistors 411 and 412, active load transistors 413 and 414, a constant-current source transistor 415, capacitor elements 416 and 417, and switch transistors 418 and 419.

The sources of the differential pair transistors 411 and 412 are connected to each other to perform a differential operation. A reference signal Vref is input to the gate of the transistor 411 through the capacitor element 416. A pixel signal is input to the gate of the transistor 412 through the capacitor element 417.

The active load transistor 413 is connected between the drain of the differentia pair transistor 411 and the power-supply line L11 of the first power-supply voltage Vdd, and the active load transistor 414 is connected between the drain of the differential pair transistor 412 and the power-supply line L11 of the first power-supply voltage Vdd. The gates of the active load transistors 413 and 414 are connected to each other. The active load transistor 413 has a diode-connected configuration in which the gate and drain thereof are connected to each other. The active load transistor 413 and the active load transistor 414 form a current mirror circuit.

The constant-current source transistor 415 is connected between a source-connected node of the differential pair transistors 411 and 412 and the power-supply line L12 of the second power-supply voltage Vss (for example, ground). A constant gate potential VG is supplied to the gate of the constant-current source transistor 415.

The switch transistor 418 is connected between the gate and drain of the differential pair transistor 411. A set signal PSET is selectively supplied to the gate of the switch transistor 418. Similarly, the switch transistor 419 is connected between the gate and drain of the differential pair transistor 412. A set signal PSET is selectively supplied to the gate of the switch transistor 419.

The inverted buffer unit 42 includes an inverted transistor 421 and a constant-current source transistor 422. The source of the inverted transistor 421 is connected to the power-supply line L11. The gate of the inverted transistor 421 is connected to the drain of the differential pair transistor 412, which is an output terminal of the differential input unit 41. Thus, the inverted transistor 421 inverts the polarity of an output of the differential input unit 41. The constant-current source transistor 422 is connected between the drain of the inverted transistor 421 and the power-supply line L12. A constant gate potential VG is supplied to the gate of the constant-current source transistor 422.

The digital unit 43 includes an inverse-conductivity-type transistors 431 and 432, which form a CMOS inverter. The inverse-conductivity-type transistors 431 and 432 are connected in series between the power-supply line L11 and the power-supply line L12. The gates of the inverse-conductivity-type transistors 431 and 432 are commonly connected to the drain of the inverted transistor 421, which is an output terminal of the inverted buffer unit 42.

A feature of the first embodiment is that each of the comparator 31 having the above-described configuration includes a capacitor element 44. The capacitor element 44 is connected between a signal line S11, which is provided between the output terminal of the differential input unit 41 and the input terminal of the inverted buffer unit 42, and the power-supply line L11, which is a constant-voltage line. The operation of the capacitor element 44 will be described later.

Figure 4:
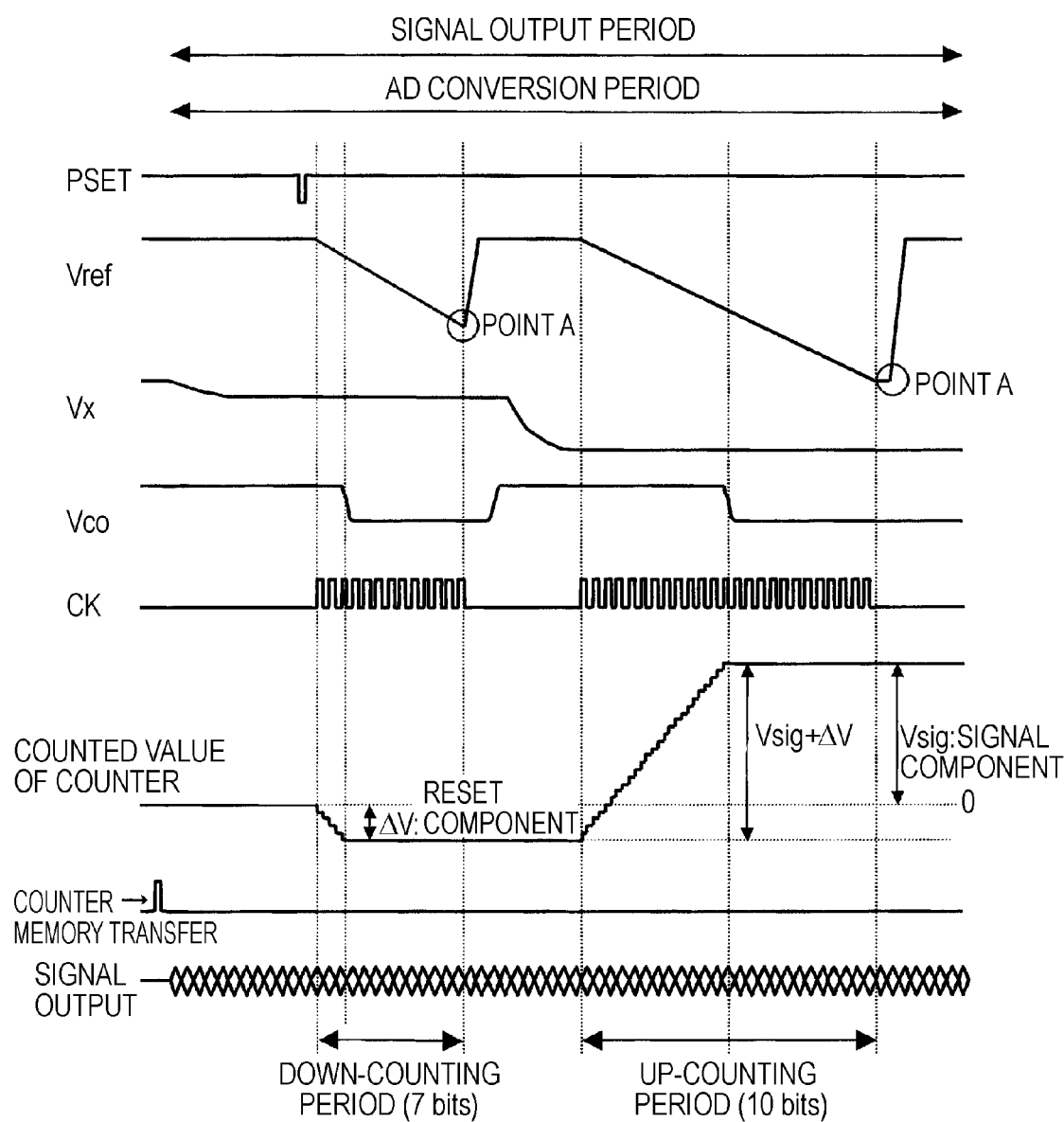
FIG. 4 is a timing chart for explaining an operation of the CMOS image sensor including the column-parallel AD conversion unit.

An operation of the CMOS image sensor 10 including the comparators 31 according to the first embodiment having the above-described configuration as a column-parallel AD conversion unit will now be described with reference to a timing chart shown in FIG. 4.

In the following descriptions, an explanation of a specific operation of each of the unit pixels 11 will be omitted. As is well known, each of the unit pixels 11 performs a reset operation using the reset transistor 113 and a transfer operation using the transfer transistor 112. In the reset operation, the potential of the FD unit 115 when the potential is reset to a predetermined potential is output as a reset component from the unit pixel 11 to the corresponding one of the column signal lines 22-1 to 22-*m*. In the transfer operation, the potential of the FD unit 115 when an electric charge obtained by photoelectric conversion is transferred from the photoelectric transducer 111 is output as a signal component to the corresponding one of the column signal lines 22-1 to 22-*m*.

After an ith row is selected by row scanning performed by the row scanning circuit 13 and a first reading operation of reading from the unit pixels 11 in the selected ith row to the column signal lines 22-1 to 22-*m* is stabilized, a set signal PSET becomes active (that is, "L" level). Thus, the operation points of the differential pair transistors 411 and 412 are set. Then, the set signal PSET becomes inactive (that is, "H" level), and a stepped-wave reference signal Vref is output from the DAC 151 to each of the comparators 31 in the ADCs 23-1 to 23*m*. Thus, in each of the differential input units 41, an input potential of the differential pair transistor 412, which is determined in accordance with the gate voltage of the amplifying transistor 114 of the corresponding unit pixel 11, is compared with an input potential of the differential pair transistor 411, which is determined in accordance with the stepped-wave reference signal Vref.

Concerning the operation sequence, at the same time as the stepped-wave reference signal Vref is input to each of the comparators 31, a clock CK is supplied from the timing control circuit 18 to each of the up/down counters 32. Thus, each of the up/down counters 32 starts a down-counting operation and measures a comparison period used for comparison performed by the corresponding comparator 31 in the first reading operation. When the reference signal Vref is equal to the signal voltage Vx of each of the column signal lines 22-1 to 22*m*, the output Vco of the corresponding comparator 31 is changed from "H" level to "L" level. In response to the polarity inversion of the output Vco of the comparator 31, the up/down counter 32 stops the down-counting operation and holds the counted value corresponding to the first comparison period for the comparator 31.

In the first reading operation, as described above, a reset component ΔV of each of the unit pixels 11 is read. The reset component ΔV contains fixed pattern noise, as an offset, which is different depending on the unit pixel 11. Since a variation in reset components ΔV is generally small and the same reset level is obtained in all the pixels, the signal voltages Vx of the column signal lines 22-1 to 22-*m* are mostly predictable. Thus, when reset components ΔV are read in the first reading operation, a comparison period can be reduced by adjustment of the reference signal Vref. In the first embodiment, comparison of the reset components ΔV is performed in a counting period for seven bits (that is, 128 clocks).

In the second reading operation, in addition to the reset components ΔV, signal components Vsig corresponding to the intensities of incident light to the individual unit pixels 11 are read as in the first reading operation for the reset components ΔV. That is, after the second reading operation from the unit pixels 11 in the selected ith row to the column signal lines 22-1 to 22-*m* is stabilized, the reference signal Vref is supplied from the DAC 151 to the comparators 31 in the ADCs 23-1 to 23*m*. Thus, the comparators 31 compare the signal voltages Vx of the column signal lines 22-1 to 22-*m* with the reference signal Vref, and at the same time, the up/down counters 32 measure comparison periods used for comparison performed by the comparators 31 in the second reading operation by performing an up-counting operation, which is opposite to the first reading operation.

As described above, each of the up/down counters 32 performs a down-counting operation as the first counting operation and an up-counting operation as the second counting operation. Thus, each of the up/down counters 32 automatically subtracts the first comparison period from the second comparison period. When the reference signal Vref is equal to the signal voltage Vx of each of the column signal lines 22-1 to 22*m*, the polarity of the output Vco of the each of the comparators 31 is inverted. In response to the inversion of the polarity, the counting operation of each of the up/down counters 32 stops. As a result, a counted value corresponding to the value obtained by subtracting the first comparison period from the second comparison period is held in each of the up/down counters 32.

The value obtained by subtracting the first comparison period from the second comparison period is equal to the value, which is the signal component Vsig, obtained by subtracting the value obtained by adding the reset component ΔV and the offset component of the ADC 23 from the value obtained by adding the signal component Vsig, the reset component ΔV, and the offset component of the ADC 23. In addition, the offset component of each of the ADCs 23 (23-1 to 23-*m*) as well as the reset component ΔV that is different depending on the unit pixel 11 are removed by the first and second reading operations and the subtraction processing performed by the corresponding up/down counter 32. Thus, only the signal component Vsig corresponding to the intensity of incident light to each of the unit pixels 11 can be extracted. In order to remove the reset component ΔV that is different depending on the unit pixel 11, so-called correlated double sampling (CDS) processing is used.

In the second reading operation, since a signal component Vsig corresponding to the intensity of incident light is read, it is necessary to greatly change the reference signal Vref in order to determine the light intensity in a wide range. Thus, in the CMOS image sensor 10 according to the first embodiment, comparison of the signal components Vsig is performed in a counting period for 10 bits (that is, 1024 clocks). In this case, the number of comparison bits in the first comparison is different from the number of comparison bits in the second comparison. However, by setting the inclination of a ramp wave of the reference signal Vref used in the first comparison to be the same as the inclination of a ramp wave of the reference signal Vref used in the second comparison, the same accuracy in AD conversion can be achieved in the first comparison and the second comparison. Thus, an accurate value can be acquired as the subtraction of the first comparison period from the second comparison period.

After completing the series of above-mentioned AD conversion operations, N-bit digital values (or periods of time corresponding to the counted values) are held in the up/down counters 32. The N-bit digital values (or the periods of time corresponding to the counted values), that is, digital signals, that have been AD-converted by the ADCs 23-1 to 23-*m* of the column processing unit 14 are sequentially output to the outside through the N-bit width horizontal output line 17 by column scanning performed by the column scanning circuit 16. Then, similar operations are repeatedly performed to generate a two-dimensional image.

In the CMOS image sensor 10 including the column-parallel AD conversion unit according to the first embodiment, the ADCs 23-1 to 23-*m* have individual memory devices 34. Thus, the CMOS image sensor 10 is capable of transferring AD-converted digital values of the unit pixels 11 in the ith row to the corresponding memory devices 34 and outputting the digital values to the outside through the horizontal output line 17, and at the same time, of performing reading operations and up/down-counting operations of the unit pixels 11 in the i+1th row.

Reduction of Circuit Noise

Circuit noise caused by a potential variation in the power supply or the ground will now be described. Each of the comparators 31 used in the first embodiment has a configuration in which when the reference signal Vref is compared with a signal voltage Vx, a current flows from the power-supply line L11 to the inverted transistor 421. Thus, depending on the column, a voltage drop occurs in the potential of the power-supply line L11.

As described above, if an output of a comparator located in a column is inverted and an output of a comparator located in the immediately adjacent column is not inverted, a comparison threshold (a comparison determination point) of the non-inverted comparator changes by the amount corresponding to the influence of a voltage drop in the power-supply line L11. The change in the threshold of the non-inverted comparator appears on the screen as circuit noise caused by a potential variation in the power-supply line L11. In particular, in a CMOS image sensor including a column-parallel AD conversion unit, for example, comparators are provided for individual columns. Thus, a large voltage drop occurs in the power-supply line L11 when a plurality of comparators are collectively inverted, resulting in generation of noise, which is problematic.

In the each of the comparators 31 used in the first embodiment, such circuit noise caused by a potential variation in the power supply or the ground is reduced by an operation of the capacitor element 44, which is connected between the signal line S11 and the power-supply line L11. The operation of the capacitor element 44 will now be described.

In each of the comparators 31, when the potential of the power-supply line L11, which is a constant-voltage line, varies, the capacitor element 44 connected between the signal line S11 and the power-supply line L11 varies the potential of the signal line S11 by capacitance coupling in accordance with the potential variation of the power-supply line L11. Thus, when the signal voltage Vx is compared with the reference signal Vref, even if a voltage drop occurs in the power-supply line L11 due to the current flowing from the power-supply line L11 to the inverted transistor 421, the potential of the signal line S11 is reduced by the amount corresponding to the voltage drop in the power-supply line L11 due to the operation of the capacitor element 44. Thus, since the comparison threshold (the comparison determination point) of the comparator 31 does not vary, circuit noise caused by the potential variation in the power-supply line L11 can be reduced.

Reduction of White Noise

Now, white noise that depends on a transistor resistance and a wiring resistance will be considered. Since white noise is determined in accordance with the product of the noise density and the pass-band width of a signal, reducing the pass-band width of the signal is effective for reducing white noise. In general, the pass-band width of a signal of each of the comparators 31 is determined in accordance with a parasitic capacitance and a parasitic resistance of the signal line S11.

In each of the comparators 31 used in the first embodiment, the capacitor element 44 is connected between the signal line S11 and the power-supply line L11. Thus, the capacitor element 44 and the wiring resistance of the signal line S11 form a low-pass filter, resulting in a reduction of white noise, which has a high-frequency component. That is, since the capacitor element 44 is connected between the signal line S11 and the power-supply line L11, the pass-band width of the signal can be reduced. Thus, in addition to a reduction of circuit noise caused by a potential variation in the power-supply line L11, a reduction of white noise can be achieved.

It is necessary to set a capacitance of the capacitor element 44 such that the comparator 31 performs a desired response. In addition, it is desired that the capacitor element 44 have the largest capacitance that satisfies the above-mentioned conditions. In terms of a response of the comparator 31, as is clear from the timing chart shown in FIG. 4, it is hard to achieve a point A at which the down slope of a stepped-wave (ramp wave) ends to return to the start potential.

That is, if the band limiting capacitance is large, the slope of a stepped wave may not be able to return to a predetermined potential within a predetermined period of time (until the start of the next stepped wave). Thus, in order to cause the slope of a stepped wave to return to a predetermined potential within a predetermined period of time, it is necessary to reduce the capacitance of the capacitor element 44 connected between the signal line S11 and the power-supply line L11 to some extent.

In the first embodiment, an example of a circuit configuration in which when each of the comparators 31 compares a signal voltage Vx with the reference signal Vref, a current flows from the power-supply line L11 of the first power-supply voltage Vdd to the corresponding inverted transistor 421 has been described. However, obviously, a circuit configuration in which a current flows from the power-supply line L12 (for example, a ground line) of the second power-supply voltage Vss to the corresponding inverted transistor 421 may be adopted. In this case, circuit noise caused by a potential variation in the ground can be reduced.

Second Embodiment

Figure 5:
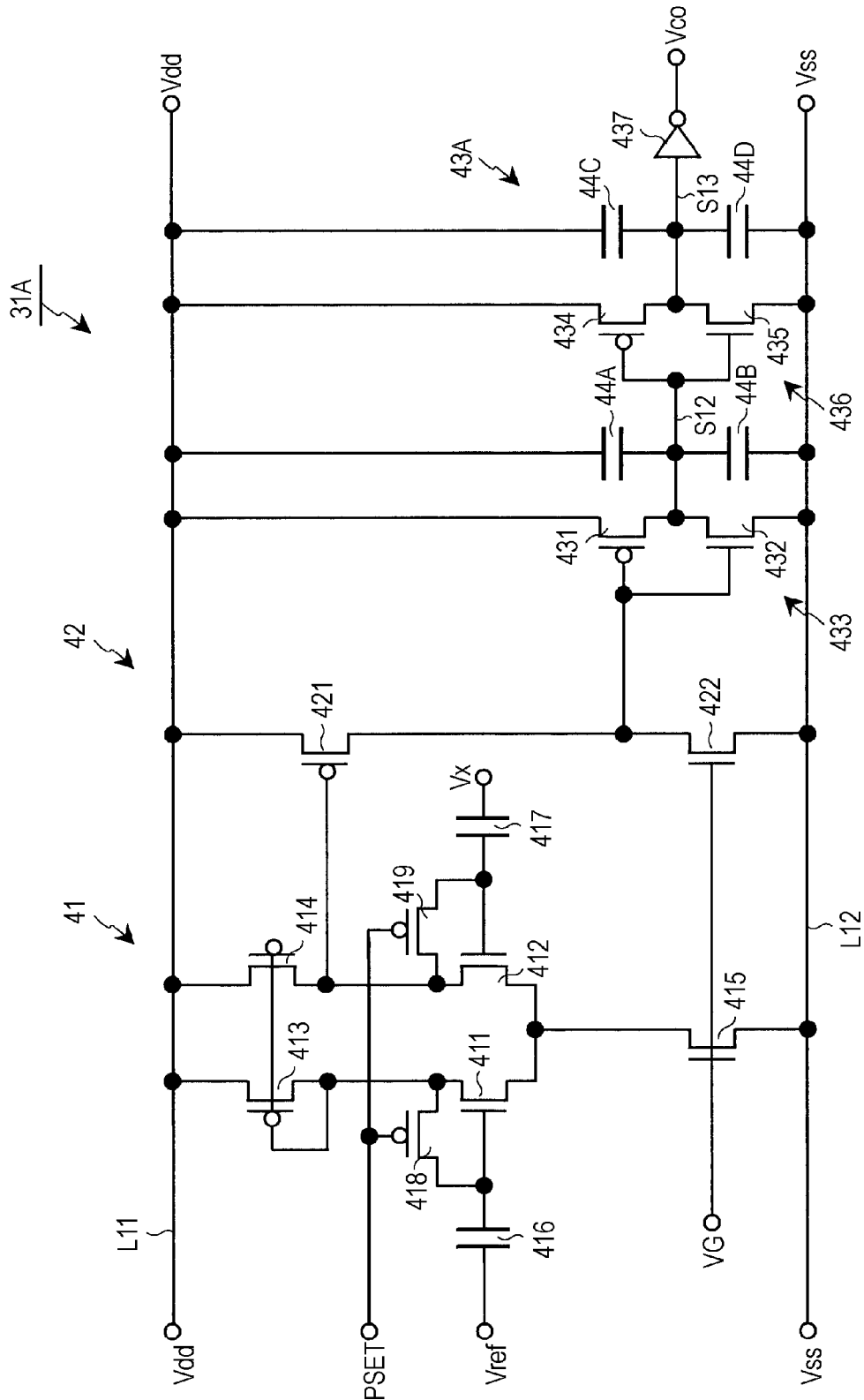
FIG. 5 is a circuit diagram showing an example of a circuit configuration of a comparator used in a second embodiment of the present invention.

FIG. 5 is a circuit diagram showing an example of a circuit configuration of a comparator used in a second embodiment of the present invention. In FIG. 5, the same parts as in FIG. 2 are referred to with the same reference numerals.

Each of comparators 31A used in the second embodiment is similar to each of the comparators 31 used in the first embodiment with the exception of a configuration of a digital unit 43A. The differential input unit 41 and the inverted buffer unit 42 in the comparator 31A have the same configurations as the differential input unit 41 and the inverted buffer unit 42 in the comparator 31.

The digital unit 43A includes a CMOS inverter 433 and a CMOS inverter 436 that are cascaded together. The CMOS inverter 433 includes inverse-conductivity-type transistors 431 and 432 that are connected in series between the power-supply line L11 and the power-supply line L12. The gates of the inverse-conductivity-type transistors 431 and 432 are connected to each other. Similarly, the CMOS inverter 436 includes inverse-conductivity-type transistors 434 and 435 that are connected in series between the power-supply line L11 and the power-supply line L12. The gates of the inverse-conductivity-type transistors 434 and 435 are connected to each other. The digital unit 43A also includes an inverter 437 that is cascaded with the two-stage CMOS inverters 433 and 436.

A feature of the second embodiment is that the comparator 31A having the above-mentioned configuration includes capacitor elements 44A and 44B and capacitors elements 44C and 44D in the digital unit 43A. The capacitor element 44A is connected between a signal line S12, which is provided between an output terminal of the first-stage CMOS inverter 433 and an input terminal of the second-stage CMOS inverter 436, and the power-supply line L11, which is a constant-voltage line. The capacitor element 44B is connected between the signal line S12 and the power-supply line L12, which is a constant-voltage line. The capacitor element 44C is connected between a signal line S13, which is provided between an output terminal of the second-stage CMOS inverter 436 and an output terminal of the third-stage inverter 437, and the power-supply line L11. The capacitor element 44D is connected between the signal line S13 and the power-supply line L12.

As described above, the capacitor element 44A is connected between the signal line S12 and the power-supply line L11, and the capacitor element 44B is connected between the signal line S12 and the power-supply line L12. In addition, the capacitor element 44C is connected between the signal line S13 and the power-supply line L11, and the capacitor element 44D is connected between the signal line S13 and the power-supply line L12. Thus, when the potentials of the power-supply lines L11 and L12 vary, the capacitor elements 44A, 44B, 44C, and 44D vary the potentials of the signal lines S12 and S13 by capacitance coupling in accordance with the potential variations in the power-supply lines L11 and L12, resulting in a reduction in circuit noise caused by the potential variations in the power-supply lines L11 and L12. Moreover, since the capacitor elements 44A, 44B, 44C, and 44D and the wiring resistances of the power-supply lines L11 and L12 form low-pass filters, white noise can also be reduced.

In the second embodiment, the digital unit 43A includes three-stage inverters 433, 436, and 437 that are cascaded with each other. In addition, the capacitor elements 44A, 44B, 44C, and 44D are connected between the signal lines S12 and S13 and the power-supply lines L11 and L12. However, only the capacitor elements 44A and 44B may be connected between the signal line S12 and the power-supply lines L11 and L12. Alternatively, only the capacitor elements 44C and 44D may be connected between the signal line S13 and the power-supply lines L11 and L12.

In addition, the digital unit 43A does not necessarily have a circuit configuration including the three-stage inverters 433, 436, and 437. If the digital unit 43A includes at least two inverters and capacitor elements connected between a signal line provided between the inverters and constant-voltage lines, circuit noise and white noise can be reduced.

In addition, in the second embodiment, capacitor elements are connected between a signal line provided between inverters of the digital unit 43A and constant-voltage lines. However, as in the first embodiment, a capacitor element may also be connected between a constant-voltage line and a signal line provided between the differential input unit 41 and the inverted buffer unit 42. In this case, circuit noise and white noise can be reduced more reliably.

As described above, the capacitor element 44 is connected between the signal line S11 and the power-supply line L11, which is a constant-voltage line, in each of the comparators 31. Alternatively, the capacitor elements 44A and 44B and/or the capacitor elements 44C and 44D are connected between the signal line S12 and/or the signal line S13 and the power-supply lines L11 and L12, which are constant-voltage lines, in each of the comparators 31A. Alternatively, the capacitor element 44 is connected between the signal line S11 and the power-supply line L11, and the capacitor elements 44A and 44B and/or the capacitor elements 44C and 44D are connected between the signal line S12 and/or the signal line S13 and the power-supply lines L11 and L12. Thus, circuit noise caused by a potential variation in the power supply or the ground can be reduced, and noise that is not removable by CDS processing can also be reduced. Therefore, the S/N ratio of an image sensor can be significantly increased.

In each of the foregoing embodiments, an example of an AD conversion unit having a configuration in which the ADCs 23 (23-1 to 23m) each including the comparator 31 are arranged in a one-to-one relationship with the column signal lines 14-1 to 14-m in accordance with pixel pitches such that the number of the ADCs 23 is equal to the number of pixel columns has been described. However, the present invention is not limited to this configuration. An AD conversion unit having a configuration in which an ADC 23 is provided for a plurality of column signal lines 14 and is used in a time-sharing manner may be used.

In addition, in each of the foregoing embodiments, a CMOS image sensor including an AD conversion unit that performs AD conversion of pixel signals (analog signals) output from the unit pixels 11 to the column signal lines 14-1, 14-2, . . . , and 14-m in the column processing unit 14 has been described. However, this is merely an example. The present invention is also applicable to a CMOS image sensor including an AD conversion unit including AD converters that are contained in the corresponding unit pixels 11, that perform AD conversion of pixel signals in the corresponding unit pixels 11, and that output the AD-converted signals to the corresponding column signal lines 14-1, 14-2, . . . , and 14-m.

In addition, in each of the foregoing embodiments, as a physical quantity distribution detecting apparatus, a solid-state imaging device, such as a CMOS image sensor, for sensing, as distribution of physical quantities, distribution of light intensities of image light emitted from a subject in units of pixels has been described as an example. However, the present invention is not limited to this. The present invention is also applicable to a general solid-state imaging device, such as a MOS image sensor, including a column-parallel AD conversion unit in an X-Y address method. Moreover, the present invention is not limited to a solid-state imaging device. The present invention is also applicable to a general physical quantity distribution detecting apparatus for sensing another type of physical quantity, such as pressure or electrostatic capacitance, in units of unit sensors.

Applications

The CMOS image sensor 10 including the column-parallel AD conversion unit according to each of the foregoing embodiments may be suitably used as an imaging device (an image input device) of an imaging apparatus, such as a video camera, a digital still camera, and a camera module for a mobile apparatus, such as a cellular phone.

Figure 6:
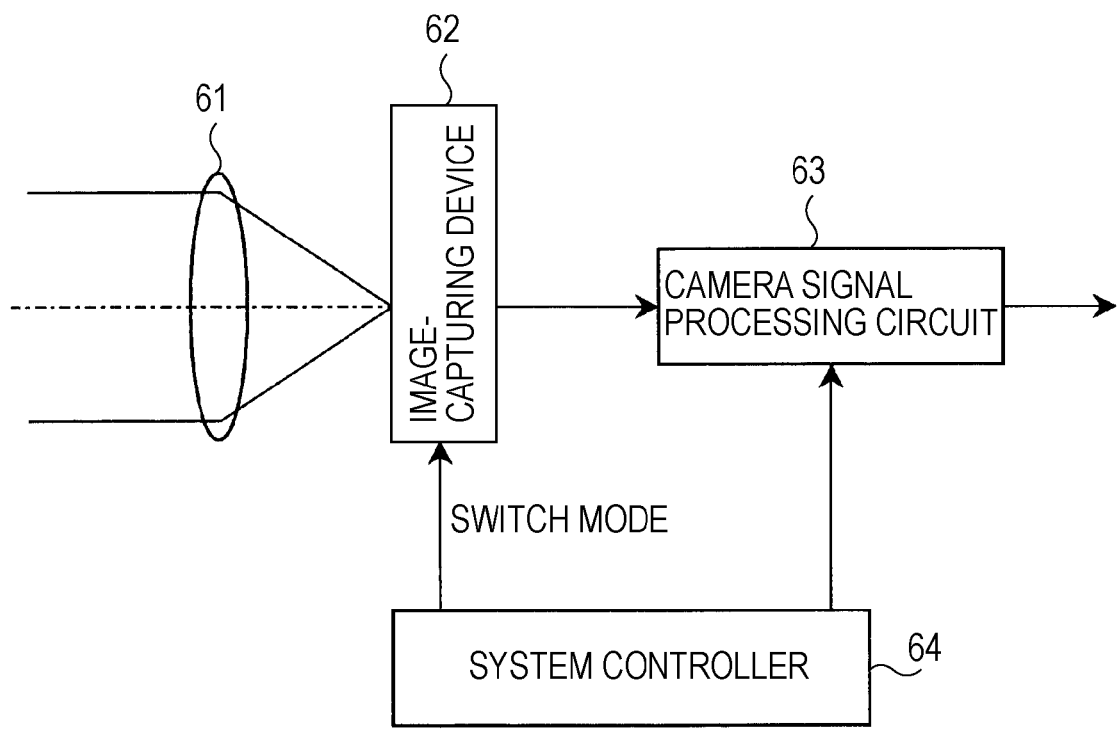
FIG. 6 is a block diagram showing an example of a configuration of an imaging apparatus according to an embodiment of the present invention.
Figure 7:
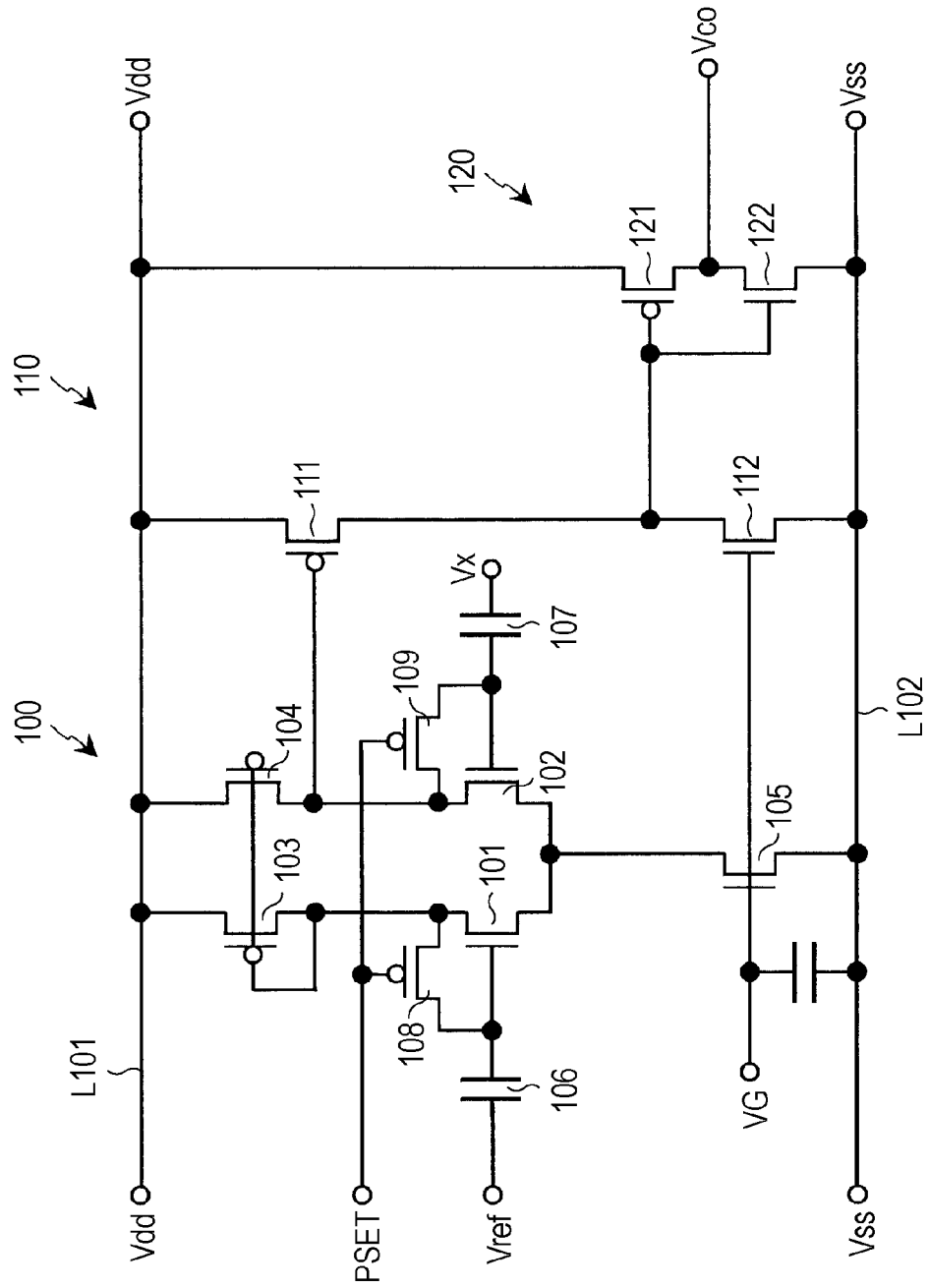
FIG. 7 is a circuit diagram showing a configuration of a comparator of the related art in a CMOS image sensor including a column-parallel AD conversion unit.

FIG. 6 is a block diagram showing an example of a configuration of an imaging apparatus according to an embodiment of the present invention. Referring to FIG. 6, the imaging apparatus includes an optical system including a lens 61, an image-capturing device 62, a camera signal processing circuit 63, a system controller 64, and the like.

The lens 61 forms image light emitted from a subject on an image-capturing plane of the image-capturing device 62. The image-capturing device 62 outputs image signals obtained by converting the image light formed on the image-capturing plane by the lens 61 into electric signals in units of pixels. The CMOS image sensor 10 including the column-parallel AD conversion unit according to each of the foregoing embodiments is used as the image-capturing device 62.

The camera signal processing circuit 63 performs various types of signal processing on image signals output from the image-capturing device 62. The system controller 64 controls the image-capturing device 62 and the camera signal processing circuit 63. In particular, if the column-parallel AD conversion unit of the image-capturing device 62 is capable of selectively performing an AD conversion operation corresponding to a normal frame rate mode based on a progressive scanning method in which information on all the pixels are read and an AD conversion operation corresponding to a fast frame rate mode in which the frame rate is increased M times by setting the exposure time of a pixel to 1/M of that in the normal frame rate mode, an operation mode can be switched in accordance with an external instruction.

As described above, the CMOS image sensor according to each of the foregoing embodiments including the column-parallel AD conversion unit including a plurality comparators is used as the image-capturing device 62 of an imaging apparatus, such as a video camera, a digital camera, a camera module for a mobile apparatus, such as a cellular phone, and the like. Thus, noise that is not removable by CDS processing can be reduced using the comparators. Therefore, the S/N ratio of the image sensor can be increased, resulting in a significant improvement in image quality.

It should be understood by those skilled in the art that various modifications, combinations, sub-combinations and alterations may occur depending on design requirements and other factors insofar as they are within the scope of the appended claims or the equivalents thereof.

What is claimed is:

1. A physical quantity distribution detecting apparatus comprising:
    a sensor array in which a plurality of unit sensors for sensing a physical quantity are two-dimensionally arranged in columns and rows in a matrix; and
    processing units to convert analog signals read from the plurality of unit sensors into digital signals,
    wherein,
        each of the processing units includes
            (a) a signal processing line that receives the analog signals from the unit sensors in a column,
            (b) at least one capacitor element connected between the signal processing line in said column and a power supply line,
            (c) an inverting buffer unit coupled to the power supply line, an input of the inverting buffer unit directly coupled to the signal line, and
            (d) a digital unit coupled to the power supply line, and
        the inverting buffer unit is connected between the capacitor and the digital unit along the same power supply line.

2. The physical quantity distribution detecting apparatus of claim 1, wherein the at least one capacitor element is effective to vary a potential of the signal processing line by capacitance coupling in accordance with a potential variation of the power supply line.

3. The physical quantity distribution detecting apparatus of claim 1, wherein the at least one capacitor element and the wiring resistance of the signal processing line form a low pass filter.

* * * * *